(No Model.)
S. H. BOND.
AUTOMATIC FRUIT GATHERER.
No. 601,235. Patented Mar. 29, 1898.
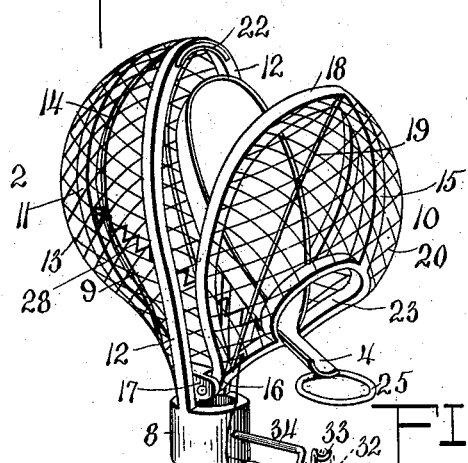
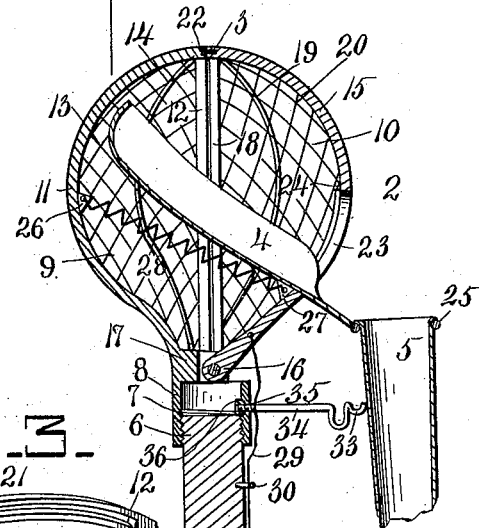
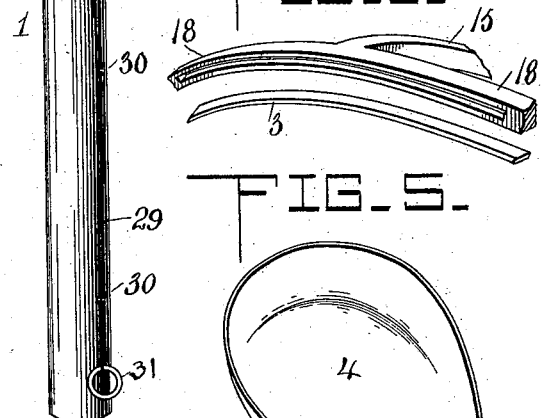
Witnesses
W. E. Allen
Victor J. Evans
Inventor
Samuel Hayes Bond.
By John Wedderburn
Attorney

UNITED STATES PATENT OFFICE.

SAMUEL HAYES BOND, OF WASHINGTON, DISTRICT OF COLUMBIA.

AUTOMATIC FRUIT-GATHERER.

SPECIFICATION forming part of Letters Patent No. 601,235, dated March 29, 1898.

Application filed June 26, 1897. Serial No. 642,497. (No model.)

*To all whom it may concern:*

Be it known that I, SAMUEL HAYES BOND, of Washington, District of Columbia, have invented certain new and useful Improvements in Automatic Fruit-Gatherers; and I do hereby declare the following to be a full, clear, and exact description of the invention, such as will enable others skilled in the art to which it appertains to make and use the same.

This invention relates to improvements in fruit-gatherers, and has more particular relation to devices for cutting the fruit from the trees and catching the same as it falls.

The invention consists of the combination, with a supporting-pole, of a fruit-catching basket mounted upon the upper end of the same and comprising a rigid section and a hinged section, the latter provided with a knife adapted to contact with the knife-section and thus sever the fruit from its stem, and means connected to the basket for catching the fruit as the same is cut.

The invention also consists of certain other novel constructions, combinations, and arrangements of parts, all of which will be hereinafter more particularly set forth and claimed.

In the accompanying drawings, forming part of this specification, Figure 1 represents a perspective view of the device embodying my invention, the hinged section being held open. Fig. 2 represents a central vertical section through my improved gatherer, the hinged section being closed. Fig. 3 represents an enlarged detailed perspective view, partly in section, of the upper portion of the stationary section of the basket containing the knife guard or block. Fig. 4 represents an enlarged detailed perspective view of the knife, and Fig. 5 represents an enlarged detailed perspective view of the trough.

1 in the drawings represents the supporting-handle; 2, the gathering-basket; 3, the knife; 4, the trough, and 5 the chute. Said handle 1 is preferably constructed of wood and is formed at its upper end, as at 6, with screw-threads adapted to engage a screw-threaded socket 7, formed in a metallic casting 8. Said basket 2 comprises a rigid section 9 and a hinged section 10, the former being mounted upon the casting 8. Said section 9 in turn comprises a central rib 11 and two side ribs 12 12, connected to the same at its upper end and extending in opposite directions outwardly, downwardly, and inwardly and connected to said casting 8. This section 9 is approximately half-pear-shaped and is covered by reticulated material 13, auxiliary supporting-ribs 14 also connecting the upper end of the arm 11 to the casting 8 to assist in holding the reticulated material in the proper position. The movable section 10 comprises an arm 15, somewhat similar to the arm 11, and formed at its lower end with an apertured lug 16, which is preferably mounted in a socket 17, formed in a casting 8. Curved arms or ribs 18 and 19, similar to the arms or ribs 12 and 14, connect the upper end of the arm 15 with the lower end of the same. Said section 10 is also covered with reticulated material 20 20, similar to that covering the stationary section. The upper segmental edge of the section 11 is formed with a segmental groove 21, into which is rigidly secured a segmental guard or block 22, preferably of wood, against which the segmental cutting-knife 3, mounted upon the upper edge of the opposite section, is adapted to abut, so that its cutting edge will not be injured when the two sections are brought quickly together. Said section 10 is provided on one side with a discharge-aperture 23, about which extends a strengthening-flange 24. The trough 4, which is preferably fan-shaped and curved in cross-section, is mounted on said flange 24, so as to project through the opening 23. The outer end of said trough 4 is provided with a supporting-ring 25, to which the chute 5, which is preferably constructed of canvas, is secured. The position of the trough 4 is such that when the section 10 is open to its full extent the inner end of the same lies somewhat within the upper edge of the section 9, so that any fruit dropping into the basket between the sections will be caught by said trough and conducted through the opening 23. The said arms 11 and 15 are each provided with an apertured lug 26 and 27, respectively, said lugs being connected by a coil-spring 28, the tension of which is such that upon the section 10 being opened and released the knife 3 will be forced forward with such rapidity as to sever the stem of the fruit as it is brought in alinement with the strip 22.

In order to open the section 10 so that the fruit may be brought into the proper position, I connect a cord or chain 29 to the same and pass said cord down through suitable screw-eyes 30, mounted upon the side of the basket 2, the lower end of the said cord being provided with a handle or knob 31, by means of which the cord is operated.

In handling the lighter fruits it is sometimes desired to dispense with the use of the chute 5. In such cases I suspend a basket or other receptacle 32 upon a hook 33, formed upon the end of an arm 34. This arm is screw-threaded at its inner end, so that it may be applied in a screw-threaded socket 35, formed in a boss 36, which is mounted upon the casting 8.

It will be observed from the foregoing description that the arm 34 may be applied or detached at will, according to the character of the fruit which is to be picked. For the heavier fruits the chute 5 is applied, in which case the arm 34 is detached; but should it be desired to pick the lighter fruits said chute 5 is detached and the arm 34 screwed into position. The fruit falling upon the trough will now drop from the outer protruding end of the same into the receptacle 32, mounted upon the hook end of said arm 34.

With my improved gatherer the operator may stand upon the ground and readily reach any portion of the tree by means of the pole 1, the only operation necessary for picking the fruit being to pull the cord 29 and then release the same after the fruit has been brought into proper position to be cut. The detachability of the handle 1 permits of the employment of different lengths of poles, according to the height of the tree from which the fruit is being picked.

By my improved device the fruit may be quickly picked and gathered without any danger of bruising the same and without climbing into the branches of the tree.

Having thus described my invention, what I claim as new, and desire to secure by Letters Patent, is—

1. In a fruit-gatherer, the combination with a supporting-pole, of a gathering-basket mounted upon the upper end of the same and comprising a stationary section and a hinged section, a trough mounted on the hinged section and adapted to discharge from the side of the same, means for drawing the two sections together, a knife mounted on the movable section and adapted to cut the fruit so that it will fall into said basket onto said trough, means for opening the movable section and a receptacle adapted to catch the fruit discharged from the trough; substantially as described.

2. In a fruit-gatherer, the combination with a supporting-pole, of a gathering-basket mounted on the upper end of the same and comprising a stationary section and a hinged section, a knife mounted on said latter section so as to cut the fruit lying between said sections, a trough mounted on said movable section and adapted to catch the fruit dropping into the basket and discharge the same from the side of said basket, a detachable hook connected to the stationary section and adapted to support a fruit-receptacle under the discharge end of the trough, means for drawing the two sections together, a device for separating the sections and permitting them to snap together again to sever the fruit between them; substantially as described.

3. In a fruit-gatherer, the combination with a supporting-handle, of a gathering-basket mounted on the upper end of the same and comprising a stationary section and a movable section, a knife mounted on the movable section, a trough also mounted on said movable section and adapted to discharge from the side of the same, and a flexible chute supported at the discharge end of said trough so as to receive the fruit therefrom; substantially as described.

In testimony whereof I have signed this specification in the presence of two subscribing witnesses.

SAMUEL HAYES BOND.

Witnesses:
C. F. A. COOK,
B. F. LEIGHTEN.